Figures 1, 2, 3:
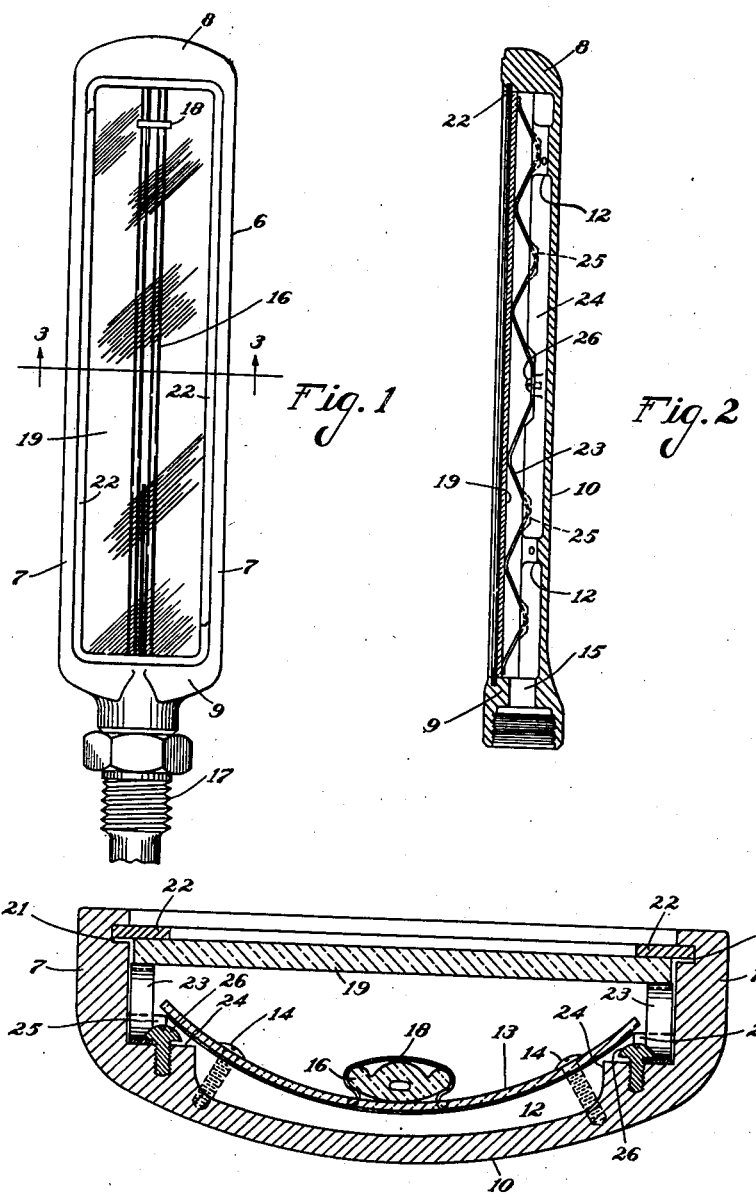

June 14, 1949.　　　C. L. WILDER ET AL　　　2,472,996
THERMOMETER
Filed Oct. 26, 1945

INVENTOR.
C. L. WILDER
H. A. KLUMB
BY
D. Clyde Jones
ATTORNEY

Patented June 14, 1949

2,472,996

UNITED STATES PATENT OFFICE 2,472,996

THERMOMETER

Cecil L. Wilder and Harvey A. Klumb, Rochester, N. Y., assignors to Taylor Instrument Companies, Rochester, N. Y., a corporation of New York Application October 26, 1945, Serial No. 624,654

5 Claims. (Cl. 73—374)

This invention relates to thermometers.

In the patent to Edwards No. 2,272,240, granted February 10, 1942, and also in the patent to Hartman No. 2,327,037, granted August 17, 1943, there is disclosed a thermometer provided with a one-piece thermometer case. A glass front closes the case, being retained therein by a bezel which may be made in one piece, as shown in the Edwards patent, or which may be made according to a novel two-piece construction as disclosed in the Hartman patent. In the thermometers shown in both of these patents, the glass fronts thereof are prevented from rattling by means of springs which snugly bias these fronts against the bezels.

In accordance with one feature of the present invention, a novel spring mounting is provided which insures uniform pressure against the inner surface of the glass front and yet reduces the number of parts required for this purpose.

In the thermometers disclosed in the mentioned patents the scale plate is made in two parts mounted within the case, with a scale part at each side of the thermometer stem. The mounting for the scale plate parts comprises supports carried on the inner surface of the case. In the patented constructions the supports have spot-welded thereto, certain zigzag springs which keep the glass fronts from rattling. The two-part scale plate has been considered necessary in the past since the scale supports with their projecting flanges, which carry the zigzag springs, have interferred with insertion of a one-piece scale plate between the thermometer stem and the case.

In accordance with a further feature of the present invention, there is provided a thermometer having a one-piece case and having a one-piece scale plate that can be readily assembled in the case, even after the thermometer stem has been inserted in the case.

The invention will best be understood by reference to the drawings in which Fig. 1 is a front view of one embodiment of the thermometer of the present invention with a portion of the protective bulb broken away; Fig. 2 is a vertical section of the thermometer case proper, the thermometer tube and the protective bulb having been omitted; and Fig. 3 is an enlarged sectional view taken substantially on the line 3—3 of Fig. 1, looking in the direction of the arrows.

The present thermometer comprises a one-piece case 6 preferably made of die-cast metal, although it will be understood that it be made of molded rubber or plastic materials, if desired. The case 6 is trough-shaped with side walls 7 and end walls 8 and 9, the back 10 being curved about its longitudinal axis. The inner surface of the back of the case is provided with two spaced transversely extending ribs 12 having arcuate front surfaces. These ribs support a one-piece scale plate 13 which is arcuate in cross section, to rest on the arcuate surfaces of the mentioned ribs. Suitable screws 14, preferably of the self-tapping type, pass through openings in the scale plate and are driven into holes provided in the ribs. The lower end 9 of the case is provided with an opening 15 (Fig. 2) through which the stem of the thermometer 16 can pass with the bulb (not shown) of the thermometer extending into the protective bulb 17, which is preferably screw-threaded into the lower end of the case. The thermometer stem is retained in close relation to the scale plate by a suitable clasp 18, so that the height of the indicating column of the liquid in the thermometer can easily be read with respect to the graduations on the scale plate.

It has been mentioned that the scale plate 13 is curved in cross section. The curvature of the scale plate and the shape of the case are such that a long side edge of the scale plate can be inserted under the thermometer stem and the scale plate can be brought into the position shown in Fig. 3 as a result of the combined rotary and sliding movement of the plate with respect to its longitudinal axis. Thus the thermometer tube can be assembled in the case before the scale plate is inserted therein. In order to effect the insertion of the scale plate into the case, the scale plate is made with a shorter radius than the radius of the ribs 12. However, after the scale plate has been inserted in the manner described, it is sprung to the shape of the ribs by means of the retaining screws 14.

The front of the case is preferably closed by a transparent cover plate 19 which is detachably and resiliently clamped within the case as will be set forth. By referring to Figs. 2 and 3, it will be noted that the side walls 7 and the end walls 8 and 9 of the case are provided with a groove 21, which preferably extends completely around the inner surface of the case. This groove receives the margin of the bezel serving to lock the glass or cover plate 19 in the case 6. The bezel is preferably made in the form of two complementary L-shaped sections 22, having interfitting ends respectively provided with tongues and recesses which serve to lock the two pieces together when assembled in the groove, as more fully disclosed in the mentioned Hartman patent. Alternatively, the bezel can be made in one piece as more fully shown in the mentioned patent to Edwards. The outside dimensions of the bezel are greater than the interior dimensions of the case so that the outer margin of the bezel when assembled in the open front of the case, will seat in the groove 21, but the inner dimensions of the bezel are such that its margin will overlie the edge of the glass cover plate 19.

It is essential to retain the cover plate or glass front 19 in the case without possiblity of rattling and for this purpose an elongated zigzag or undulating spring 23 is provided at each side of the case. These springs are supported on shoulders 24 integral with and extending along the inner surface of the side walls of the case, with those portions of the zigzag springs which are directed toward the rear of the case, engaging recesses 25 molded in these shoulders. These recesses tend to prevent the springs from being displaced laterally from the respective shoulders.

Preferably the spring 23 is made by shaping a piece, cut of proper length from ribbon or strip material into the zigzag form illustrated. Each spring 23 is retained in fixed location on its related shoulder 24 by means of a self-tapping screw 26 which is forced into an opening in the shoulder. It will be noted that one side of the relatively large, flat, head of the screw engages the margin of an intermediate portion of the spring to retain the spring frictionally on its related shoulder.

We claim:

1. A thermometer comprising a case having a back and side and end walls, a shoulder formed integral with the inner surface of each side wall and facing the front of said case, a transparent cover plate for approximately closing the front of said case and receivable within said side and end walls, a bezel retaining the cover plate in said case, and an undulating spring supported on each shoulder and engaging the inner surface of the cover plate.

2. A thermometer comprising a case having a back and side and end walls, the inner surface of said side and end walls having groove portions therein, a shoulder integral with the inner surface of each side wall and facing the front of said case, a transparent cover plate for approximately closing the front of said case and receivable within said side and end walls, and a bezel received in said groove portions, a part of said bezel overlying the margin of said cover plate to retain the same in said case, and an undulating spring formed from ribbon stock and secured on each shoulder, said springs engaging the inner surface of said cover plate.

3. A thermometer comprising a case having a back and side and end walls, the inner surface of said side and end walls having groove portions therein, a shoulder provided with recesses and integral with the inner surface of each side wall to face the front of the case, a transparent cover plate for approximately closing the front of said case and receivable within said side and end walls, a bezel received in said groove portions, a portion of said bezel overlying the margin of said cover plate to retain the same in said case, and an undulating spring formed from ribbon stock and anchored on each shoulder with certain of said undulations resting in said recesses, said springs engaging the inner surface of said cover plate.

4. A thermometer comprising a case having a back and side and end walls, a shoulder formed on the inner surface of each side wall and facing the front of said case, spaced ribs within said case, each rib having an arcuate surface facing the front of the case and extending at right angles to the sides of the case, an arcuate scale anchored on said ribs, a thermometer tube having its stem supported in close relation to said scale plate, a transparent cover plate for approximately closing the front of said case and receivable within said side and end walls, a bezel overlying the margin of said cover plate and engaging the case to retain the cover plate in said case, and an undulating spring secured on each shoulder, said springs engaging the inner surface of said cover plate.

5. A thermometer comprising a case having a back and side and end walls, a shoulder formed on the inner surface of each side wall and facing the front of said case, spaced ribs within said case, each rib having an arcuate surface facing the front of the case and extending at right angles to the sides of the case, an arcuate scale plate of shorter radius than that of the arcuate surfaces of said ribs, means for forcing said scale to conform to the shape of the front surfaces of said ribs and for anchoring said scale plate to said ribs, a thermometer tube having its stem supported in close relation to said scale plate, a transparent cover plate for approximately closing the front of said case and receivable within said side and end walls, a bezel overlying the margin of said cover plate and engaging the case to retain the cover plate in said case, and an undulating spring secured on each shoulder, said springs engaging the inner surface of said cover plate.

CECIL L. WILDER.
HARVEY A. KLUMB.

REFERENCES CITED

The following references are of record in the file of this patent:

UNITED STATES PATENTS

| Number | Name | Date |
|---|---|---|
| 1,984,819 | Bandoly | Dec. 18, 1934 |
| 2,272,240 | Edwards | Feb. 10, 1942 |
| 2,297,792 | Neuwirth | Oct. 6, 1942 |
| 2,312,873 | Bruns | Mar. 2, 1943 |
| 2,327,037 | Hartman | Aug. 17, 1943 |